Patented June 1, 1926.

1,587,270

UNITED STATES PATENT OFFICE.

MURRAY C. BEEBE, ALEXANDER MURRAY, AND HAROLD V. HERLINGER, OF CINCINNATI, OHIO, ASSIGNORS TO THE WADSWORTH WATCH CASE COMPANY, OF DAYTON, KENTUCKY, A CORPORATION OF KENTUCKY.

CONDENSATION PHOTOGRAPHIC PROCESS, MEDIA, AND PROCESS OF PREPARING SAME.

No Drawing.   Application filed November 24, 1922.   Serial No. 603,115.

The present invention relates to the use of artificial resins as light-sensitive media. The present invention constitutes a species of the generic invention, described in our application No. 613,795, filed January 19, 1923.

The primary object of the present invention is to provide for the use of phenolic condensation products for photographic purposes. The invention is applicable to various photographic purposes, and may be especially valuable in its application to photo processes, as variously employed, for industrial purposes.

In the above designated co-pending application, reference is made to the use of various synthetic resins for photographic purposes. The present application is directed to the use of phenolic condensation products, particularly. Prior to our invention, synthetic resins had not been known to be available for photographic purposes.

In accordance with the present invention, we make use of a phenolic condensation product, or a phenol resin, which may be produced in any desired manner. As is well known, such resins may be produced by condensing the phenols with an active methylene body, such as formaldehyde, hexamethylenetetramine or other active methylene body, it being now generally understood that the methylene radical, or methylene group, of such an active methylene body combines with the phenol to produce the condensation product.

It is preferred to incorporate in a solution of a phenolic resin a small percentage of a suitable sensitizing agent, and thereby greatly increase the sensistivity of the resin to the action of light; and, preferably, the sensitizing agent employed comprises a halogen source, or a halogen-liberating compound. According to one method, the sensitizing medium may be prepared as a varnish or lacquer, may be applied as a thin coating to a suitable surface or support, and may then be acted upon selectively by light in accordance with an image, design, or character, to effect the desired transformation, after which the film may be developed or fixed in a suitable manner. The invention renders available the use of phenol condensation products for various purposes, including photo-engraving, photo-lithography, metal decorating, etching, and miscellaneous photographic processes.

It may be stated that hydrophobic organic colloids may be classified chemically in two main divisions—saturated compounds and unsaturated compounds. The unsaturated compounds comprise the carbocyclic, heterocyclic and aliphatic series. A variety of synthetic resins, natural resins and resinous polymerization products are included in these series; but, as indicated above, the present application is confined to the synthetic products related to carbocyclic series. It is well known that in the industrial arts phenolic condensation products are widely used as varnishes, lacquers, and for other purposes, including the production of laminated plates, moulded articles, etc. Such condensation products possess various degrees of solubility in various reagents, depending largely upon the precise steps employed in producing the resins; and these resins are inherently sensitive to light in some degree, and therefore, require the use in association therewith of suitable sensitizers, for best results.

The use of sensitizers expedites the transformation which occurs under the action of light, and the image may be developed by the use of various solutions, selective dyeing, or the application of soap and water.

As sensitizers, we have found magenta, or rhodamine, alone or in combination with iodine to give excellent results. Iodoform is also a good sensitizer. In addition, the metal alkyls, such as lead tetra ethyl, combined with a slight excess of iodine (perhaps forming tri ethyl iodide) also have been found to act very well as sensitizers, producing images within three minutes which are rapidly developed by simply immersing them in solvents, such as alcohol and water.

The following is given as an example: 12 grams of phenol, 30 grams of 40% solution of formaldehyde, and 2.7 grams of sodium acetate are heated in a reflux condenser for 4½ hours, being held at a temperature of about 105 degrees C. The resulting resinous product, after decanting, is dried. Such a product is soluble in ordinary solvents, and is potentially reactive, that is, may be further condensed. The resin itself is but slightly sensitive to light but if a small percentage of iodine in benzol (benzene) is added, a photographic print is produced under a three minute exposure, and may be developed in a solution of about equal parts of alcohol and water.

As another example, a mixture of materials as stated above was heated in a reflux condenser for 6½ hours, without producing stratification. The resin was dried. Approximately 5 grams of the resin was mixed with about ½ cc. of a 5% iodine solution in benzol. This produced a coating medium which, on being applied to a suitable surface, produced a print under similar illuminating conditions in five minutes. The addition of a few drops of lead nitrate in alcohol to the above coating increased the sensitivity, so that a good print was secured in two minutes.

As a further example, we may state that a condensation was produced by boiling 10 grams of cresol, 5 grams of 40% solution of formaldehyde, and 15 grams of glacial acetic acid in a reflux condenser for about one and one-half hours. This product was sensitized in iodine and produced a print in three minutes' exposure.

Our photographic medium may be applied in any desired manner to any desired surface, and may be exposed to a luminous image in accordance with known methods. The new photographic medium may be used for a wide variety of photographic purposes.

In the practice of our process, we are not confined to the use of condensation products which have been carried to the thick resinous condition, but we may also use condensations which are simply more or less viscous colloidal compounds—varnish-like substances—that may be similarly sensitized.

In addition to the sensitizers heretofore mentioned, we have found that hydrogen iodide (hydriodic acid) may be employed. Any compound which will liberate a halogen under the action of light is available.

While it is preferred to employ the medium in the form of varnish or lacquer, the invention is not limited thereto.

The foregoing detailed description has been given for clearness of understanding only, and no unnecessary limitations should be understood therefrom, but the appended claims should be construed as broadly as permissible for the processes and products intended to be protected by the present application, in view of the prior art.

What we regard as new and desire to secure by Letters Patent is:

1. The method of preparing a photographic medium which comprises incorporating with a phenolic condensation product a suitable sensitizer.

2. The method of preparing a photographic medium which comprises incorporating with a phenolic condensation product a sensitizer comprising a halogen source.

3. The method of preparing a photographic medium which comprises incorporating with a phenolic condensation product a sensitizer comprising a halogen liberating compound.

4. The method of preparing a photographic medium which comprises incorporating with a phenolic condensation product a sensitizer comprising a halogen-substituted hydrocarbon.

5. The method of preparing a photographic medium which comprises incorporating with a phenolic condensation product a sensitizer comprising iodoform.

6. The method of preparing a photographic medium which comprises incorporating with a phenolic condensation product a sensitizer comprising a halogen-substituted hydrocarbon and a metallic halide.

7. A photographic medium comprising a phenolic condensation product and a sensitizer incorporated therewith.

8. A photographic medium comprising a phenolic condensation product and a sensitizer comprising a halogen source.

9. A photographic medium comprising a phenolic condensation product and a sensitizer comprising a halogen liberating compound.

10. A photographic medium comprising a phenolic condensation product and a sensitizer comprising a halogen-substituted hydrocarbon.

11. A photographic medium comprising a phenolic condensation product and a sensitizer comprising iodoform.

12. A photographic medium comprising a phenolic condensation product and a sensitizer comprising a halogen-substituted hydrocarbon and a metallic halide.

13. The process which comprises photographically forming an image, design or character which embodies a phenolic condensation product.

14. The process which comprises acting selectively with light in accordance with an image, design or character upon a body comprising a phenolic condensation product, to effect the desired transformation.

15. The process which comprises acting selectively with light in accordance with an image, design or character upon a body comprising a phenolic condensation product, to effect the desired transformation, and developing the image.

16. The process which comprises forming a film of a solution of a phenolic condensation product, and acting upon such film selectively with light in accordance with an image, design or character.

17. The process which comprises forming a film comprising a solution of a phenolic condensation product having a sensitizer associated therewith, and acting selectively upon said film with light in accordance with an image, design or character.

18. The process which comprises applying to a suitable surface a coating comprising a solution of a phenolic condensation product associated with a small percentage of a sensitizer comprising a halogen source, and acting selectively upon said coating with light in accordance with an image, design or character.

19. A photographic print comprising a phenolic condensation product embodying an image, design or character.

In testimony whereof we affix our signatures.

MURRAY C. BEEBE.
ALEXANDER MURRAY.
HAROLD V. HERLINGER.